(12) United States Patent
Pettersson

(10) Patent No.: US 10,899,339 B2
(45) Date of Patent: Jan. 26, 2021

(54) SYSTEMS AND METHODS FOR OPERATING A HYBRID VEHICLE WITH A MANUAL SHIFT TRANSMISSION

(71) Applicant: Ford Global Technologies, LLC, Dearborn, MI (US)

(72) Inventor: Lars Niklas Pettersson, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 212 days.

(21) Appl. No.: 16/000,173

(22) Filed: Jun. 5, 2018

(65) Prior Publication Data

US 2019/0367009 A1  Dec. 5, 2019

(51) Int. Cl.
*B60W 10/06* (2006.01)
*B60W 20/15* (2016.01)
(Continued)

(52) U.S. Cl.
CPC ............ *B60W 20/15* (2016.01); *B60W 10/06* (2013.01); *B60W 10/08* (2013.01); *B60W 30/19* (2013.01); *B60W 50/14* (2013.01); *B60W 2050/143* (2013.01); *B60W 2050/146* (2013.01); *B60W 2510/0208* (2013.01); *B60W 2510/0638* (2013.01); *B60W 2510/102* (2013.01); *B60W 2510/1005* (2013.01); *B60W 2510/1015* (2013.01); *B60W 2540/14* (2013.01); *B60W 2710/0644* (2013.01); *B60W 2710/0661* (2013.01); *B60W 2710/081* (2013.01);
(Continued)

(58) Field of Classification Search
CPC ...... B60W 20/15; B60W 10/06; B60W 50/14; B60W 30/19; B60W 10/08; B60W 2710/082; B60W 2710/081; B60W 2710/0661; B60W 2710/0644; B60W 2510/102; B60W 2510/1015; B60W 2510/1005; B60W 2510/0638; B60W 2510/0208; B60W 2540/14; B60W 2050/146; B60W 2050/143; B60W 50/0097; B60W 2710/02; B60W 2710/08; B60W 2710/06; B60W 2510/02; B60W 40/00; B60W 10/02; B60Y 2200/92; Y10S 903/93

See application file for complete search history.

(56) References Cited

U.S. PATENT DOCUMENTS 5,569,115 A   10/1996 Desautels et al.
7,294,092 B2 * 11/2007 Walker .................. B60W 10/11
                                                        477/107
(Continued)

FOREIGN PATENT DOCUMENTS

DE         3912359 A1   10/1990
DE    102015012233 A1    4/2016
(Continued)

*Primary Examiner* — David J Hlavka
(74) *Attorney, Agent, or Firm* — David Kelley; McCoy Russell LLP

(57) ABSTRACT

Systems and methods for operating a vehicle that includes a manual transmission are presented. In one example, a speed rate of change of a driveline torque source is adjusted during shifting gears of the manual transmission responsive to a rate of release of a clutch pedal. The driveline torque source rotational speed adjustment aligns rotational speeds of driveline components.

6 Claims, 7 Drawing Sheets

(51) Int. Cl.
*B60W 10/08* (2006.01)
*B60W 30/19* (2012.01)
*B60W 50/14* (2020.01)

(52) U.S. Cl.
CPC .... *B60W 2710/082* (2013.01); *B60Y 2200/92* (2013.01); *Y10S 903/93* (2013.01)

(56) References Cited

U.S. PATENT DOCUMENTS

| | | | | |
|---|---|---|---|---|
| 8,016,723 | B2* | 9/2011 | Murayama | B60W 30/19 |
| | | | | 477/110 |
| 8,229,632 | B2* | 7/2012 | Ellis | B60K 6/485 |
| | | | | 123/493 |
| 9,694,826 | B1 | 7/2017 | Puri et al. | |
| 2008/0255738 | A1* | 10/2008 | Murayama | F02D 41/023 |
| | | | | 701/54 |
| 2010/0217489 | A1* | 8/2010 | Turski | F02D 41/28 |
| | | | | 701/48 |
| 2016/0068163 | A1* | 3/2016 | Fujii | F16D 48/06 |
| | | | | 701/54 |
| 2016/0311433 | A1* | 10/2016 | Shelton | B60W 10/06 |
| 2017/0369065 | A1* | 12/2017 | Kim | B60W 10/02 |

FOREIGN PATENT DOCUMENTS

| | | | |
|---|---|---|---|
| EP | 2574829 | A1 | 4/2013 |
| WO | 2015183937 | A1 | 12/2015 |

\* cited by examiner

SYSTEMS AND METHODS FOR OPERATING A HYBRID VEHICLE WITH A MANUAL SHIFT TRANSMISSION

FIELD

The present description relates to systems and methods for operating a vehicle with a transmission that may be selectively coupled to a torque source. The methods and system may be particularly useful for improving manual shifting.

BACKGROUND AND SUMMARY

Manual transmissions allow a driver of a vehicle to have control over transmission gear shifting. They also require the driver to perform orchestrated movements to achieve seamless gear shifts. For example, a manual transmission may be shifted when a driver depresses a clutch pedal and adjusts a position of a manual shift lever. The clutch pedal opens a single clutch that disconnects an input shaft of the transmission from an engine crankshaft. Once the clutch is open the driver may engage a new gear by changing a position of a shift lever. Once the new gear is engaged, the clutch may be released to mechanically couple the engine's crankshaft to the vehicle's wheels. However, to achieve smooth shifts with minimal driveline torque disturbances, the driver may need to increase the rotational speed of the engine if the transmission is being downshifted due to a speed of the transmission's input shaft increasing when a lower gear is engaged. One way for the driver to increase engine speed during a transmission downshift is for the driver to touch the accelerator pedal with his or her heal for an instant while at the same time applying the brake pedal. Nevertheless, such a maneuver may be difficult for some drivers to perform. Consequently, many drivers may feel the vehicle lurch whenever the transmission is downshifted.

The inventor herein has recognized the above-mentioned disadvantages and has developed a method for operating a vehicle, comprising: increasing a rotational speed rate of change of a torque source of a driveline responsive to a rate of release of a clutch pedal by a human driver via a controller during a gear shift of a manual transmission.

By increasing a rotational speed rate of change of a driveline torque source responsive to a rate of release of a clutch pedal by a human driver, it may be possible to provide the technical result of improving shifting of a manual transmission by an inexperienced driver. In particular, a rate of release of a clutch pedal may be indicative of when a torque capacity (e.g., an amount of torque a clutch may transfer when a particular force is applied to close the clutch) of the manually operated clutch will meet the torque output of the driveline torque source. As such, a rate of speed increase of a driveline torque source may be adjusted so that the rotational speed of the driveline torque source matches transmission input shaft rotational speed when the clutch's torque capacity reaches the torque output of the driveline torque source. Consequently, the possibility of excessive clutch slippage and driveline torque disturbances may be reduced.

The present description may provide several advantages. In particular, the approach may reduce driveline torque disturbances and clutch wear. Further, the approach may improve a driver's confidence level when shifting a manual transmission. Additionally, the approach may increase driveline efficiency during manual transmission gear shifting.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
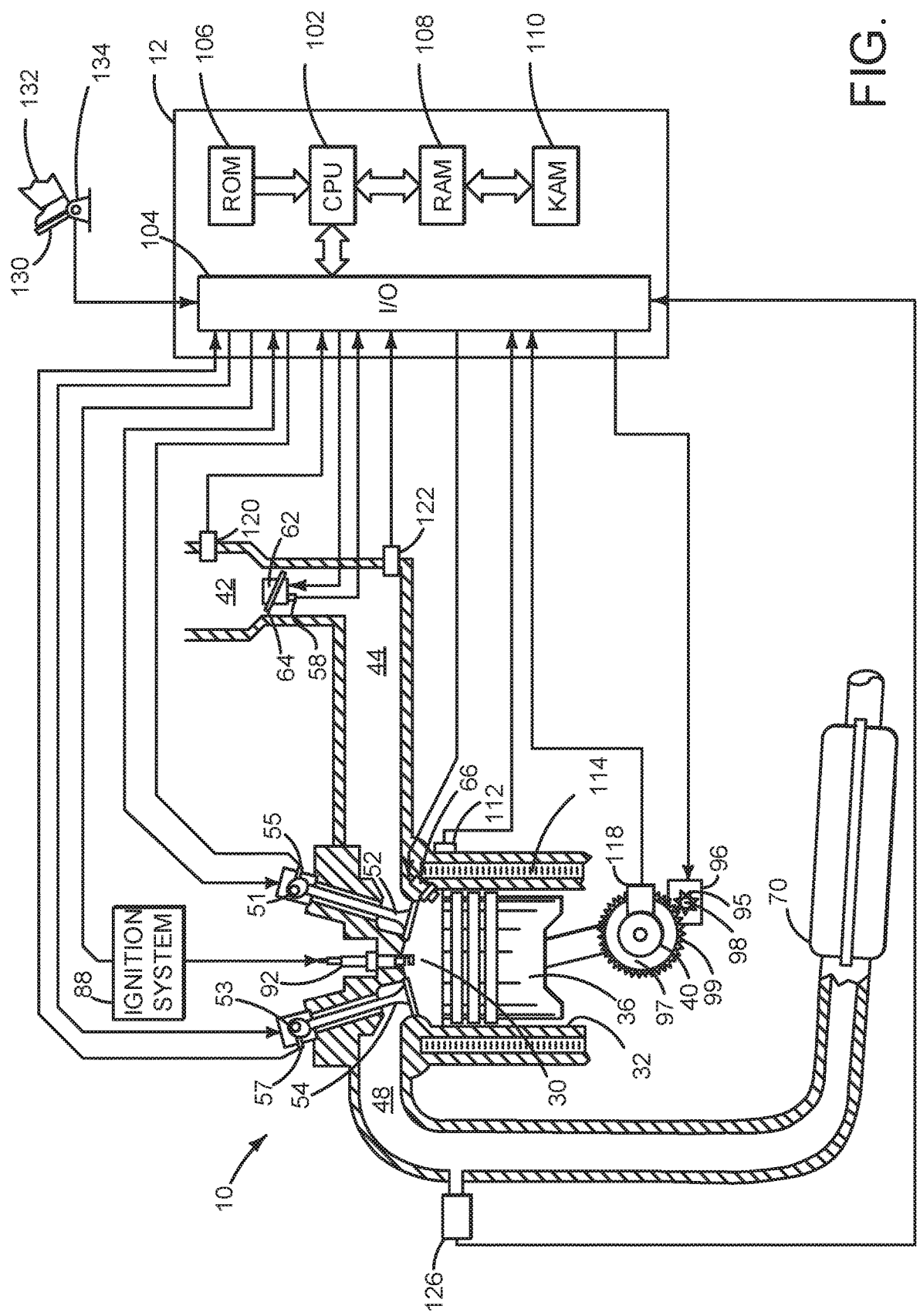
FIG. 1 is a schematic diagram of an engine.
Figure 2:
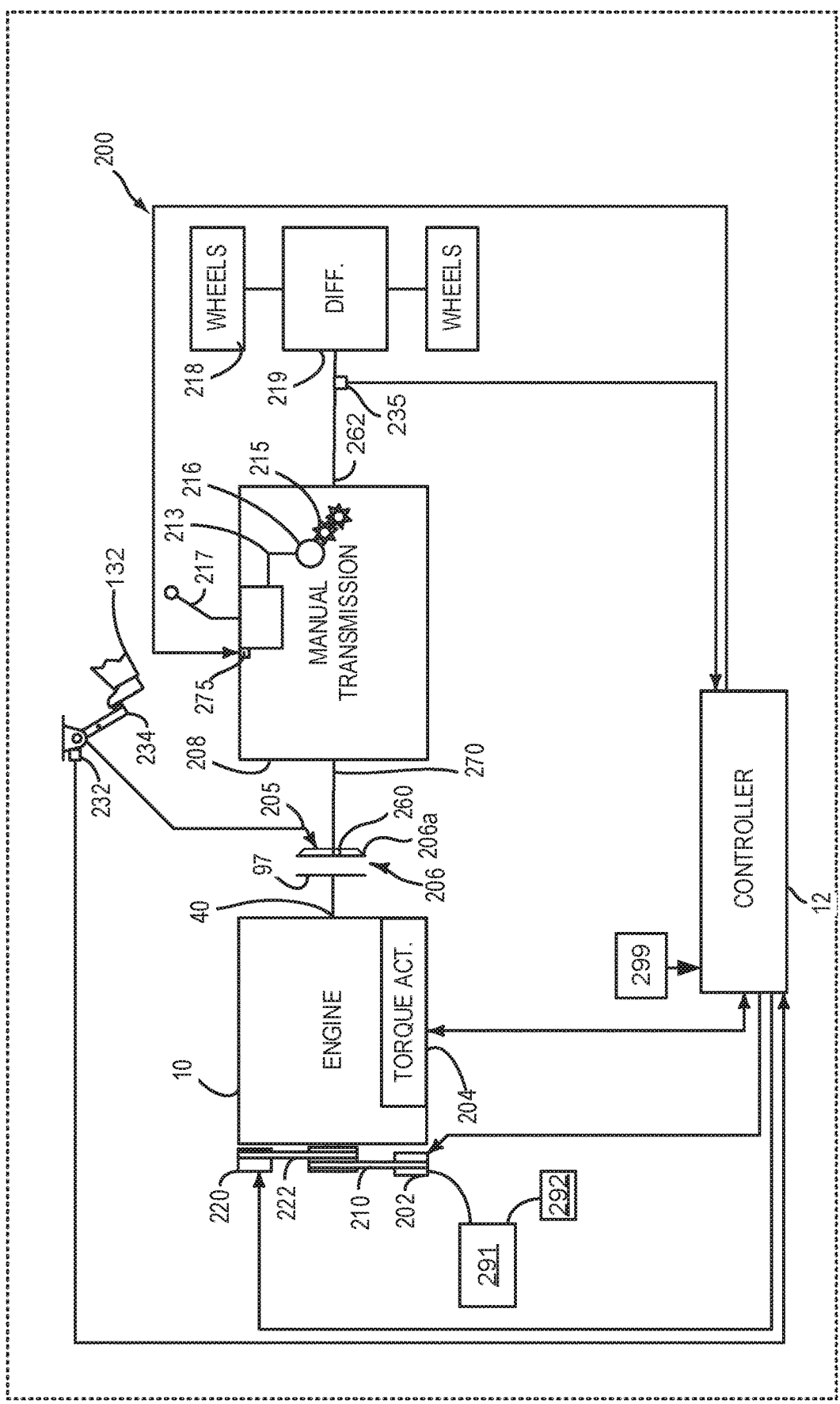
FIGS. 2 and 3 are example vehicle driveline configurations.
Figure 3:
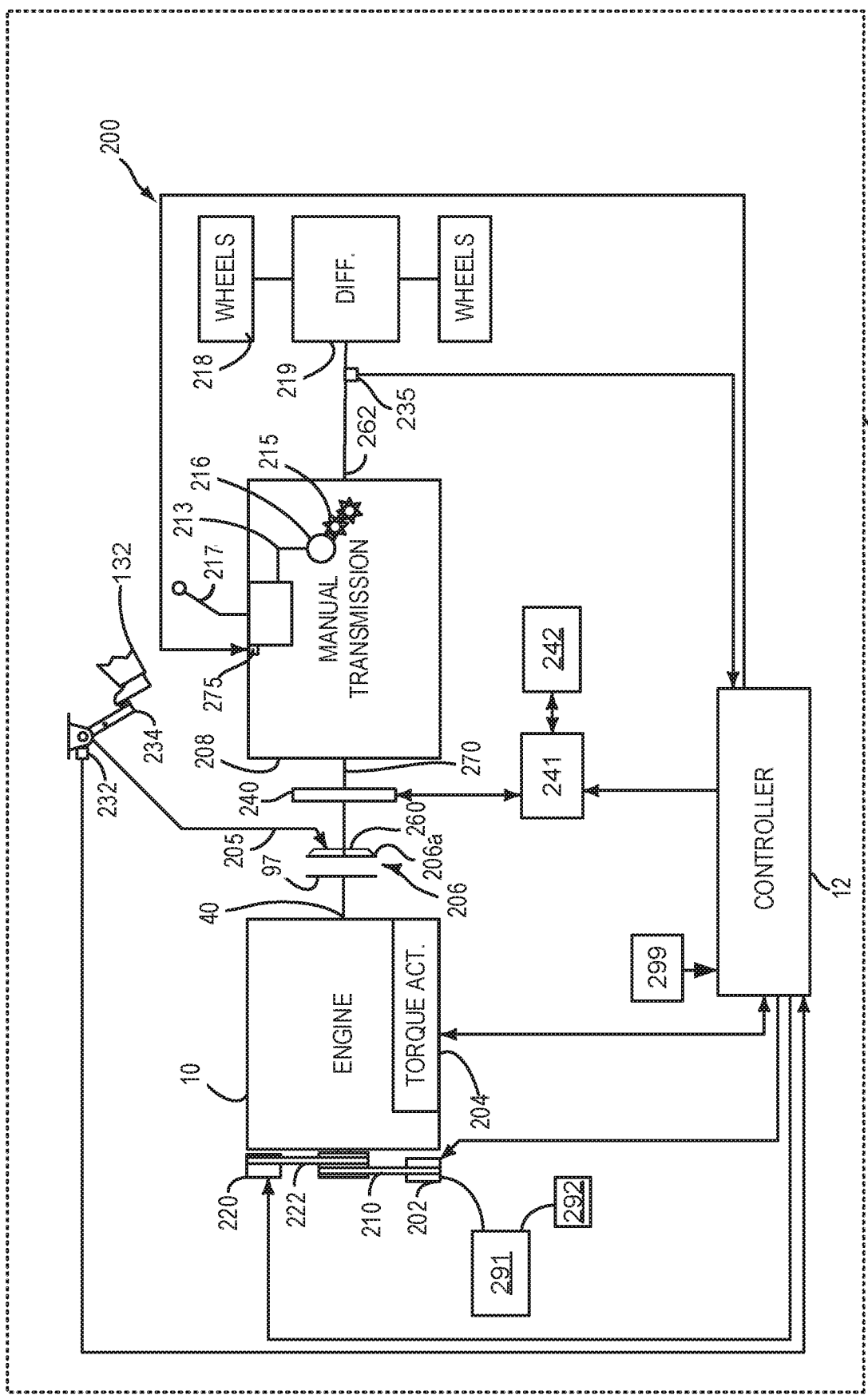
Figure 4:
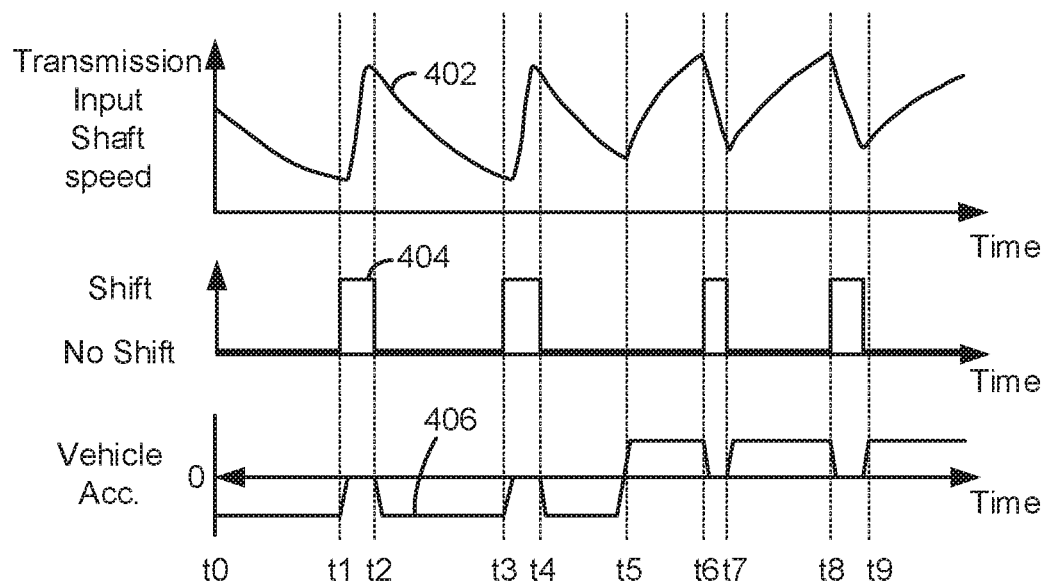
FIG. 4 shows example shifting sequence for a manual transmission.
Figure 5:
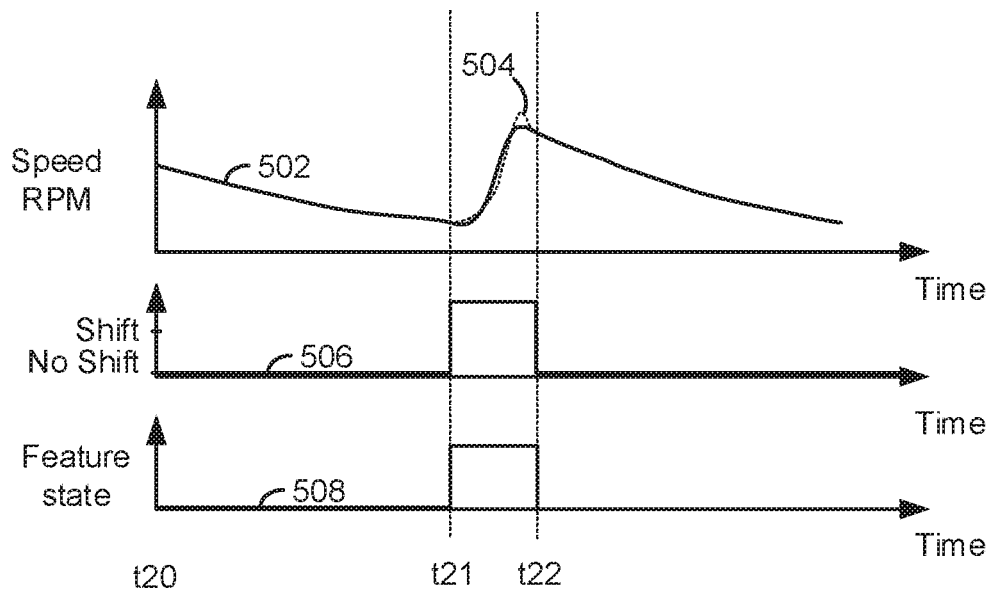
FIG. 5 shows an example of driveline torque source rotational speed control during a transmission downshift.
Figure 6:
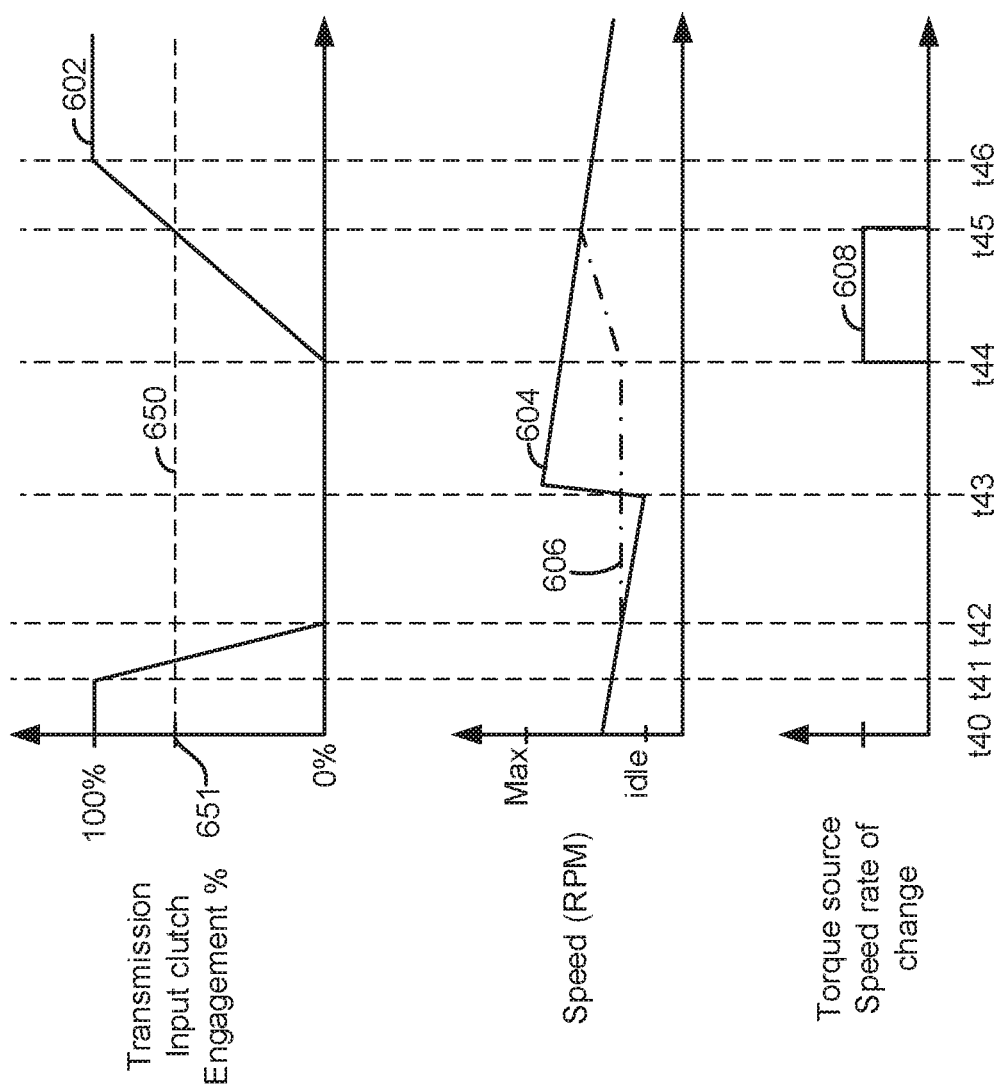
FIG. 6 shows an example manual transmission gear shift according to the method of FIGS. 7A and 7B.

The present description is related to operating a vehicle that includes an internal combustion engine and a manual transmission. A human driver may lack dexterity and experience to smoothly shift a manual transmission, but a controller may assist the human driver by adjusting a speed of a torque source and providing prompts for releasing the manual clutch. A vehicle with a manual transmission may include an engine as shown in FIG. 1. The engine may be mechanically coupled to driveline configurations as shown in FIGS. 2 and 3. FIGS. 4-6 illustrate different transmission gear shifting sequences in which the method of FIGS. 7A and 7B may be used to advantage.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1-3 and employs the various actuators of FIGS. 1-3 to adjust engine and driveline operation based on the received signals and instructions stored on memory of controller 12. Engine 10 and electric machines described herein that provide torque to the vehicle driveline may be referred to as driveline torque sources.

Engine 10 includes combustion chamber 30 and cylinder walls 32 with piston 36 positioned therein and connected to crankshaft 40. Flywheel 97 and ring gear 99 are coupled to crankshaft 40. Crankshaft 40 rotates and selectively provides power to vehicle wheels via a driveline. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Liquid fuel injector 66 is shown positioned to inject fuel directly into cylinder 30, which is known to those skilled in the art as direct injection. Alternatively, liquid fuel may be injected to an intake port, which is known to those skilled in the art as port injection. Fuel injector 66 deliver liquid fuel in proportion to pulse widths provided from controller 12. Fuel is delivered to fuel injector 66 by a fuel system (not shown) including a fuel tank, fuel pump, and fuel rail (not shown).

Intake manifold 44 is shown communicating with optional electronic throttle 62 which adjusts a position of throttle plate 64 to control air flow from air intake 42 to intake manifold 44. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

A human driver 132 inputs a driver demand torque to controller 12 via accelerator pedal 130 and accelerator pedal position sensor 134. The driver demand torque may be a function of vehicle speed and accelerator pedal position.

Controller 12 is shown in FIG. 1 as a conventional microcomputer including: microprocessor unit 102, input/output ports 104, non-transient memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200. Driveline 200 may be powered by engine 10 in vehicle 290. Engine 10 may be started with an engine starting system shown in FIG. 1. Further, engine 10 may generate or adjust torque via torque actuator 204, such as a fuel injector, cam, throttle, etc. Engine 10 may provide torque to alternator 202 via belt 210 to provide electrical power to electrical devices. Thus, alternator 202 selectively applies a negative torque to engine 10. Further, electrical charge is supplied by alternator 202 to electric energy storage device (e.g., battery) 291. Electric energy storage device supplies charge to ancillary electrical devices 292 (e.g., window defroster, radio, etc.). Optional belt integrated starter/generator (BISG) 220 is an electric machine that may selectively apply positive or negative torque to engine 10 via belt 222. BISG 220 may supply a positive torque to start engine 10 or to increase driveline torque when output torque of engine 10 is limited or insufficient to meet a driver demand torque.

An engine output torque may be transmitted from crankshaft 40 to manually operated clutch 206. Crankshaft 40 is directly coupled to flywheel 97 and manually operated clutch 206 selectively engages flywheel 97 to transmit engine torque to transmission input shaft 270. An output side 260 of manually operated clutch 206 is directly coupled to input shaft 270 of transmission 208. An actuator 205 moves manually operated clutch plate 206a in a longitudinal direction to engage or disengage transmission input shaft 270 to the engine flywheel 97. Clutch actuator 205 may be comprised of a combination of mechanical, electrical, and hydraulic components. In one mode, a position of actuator 205 is adjusted to move proportionately with a position of clutch pedal 234 so that clutch 206 may be applied and released. A position of clutch pedal 234 is relayed to controller via sensor 232. Clutch pedal 234 is in a base position when human driver 132 is not touching clutch pedal 234. Driver 132 applies force to move clutch pedal from its base position so that manually operated clutch 206 may be opened when clutch pedal 234 is applied. Manually operated clutch 206 may be closed when clutch pedal 234 is released.

Input shaft 270 of manually operated transmission 208 may be selectively coupled to gears (e.g., gears 1-6) 215. The gears 215 are fixed ratio gears that provide different ratios between transmission input shaft 270 and output shaft 262. Gears 215 may freely rotate about the output shaft 262 and synchronizers 216 may be utilized to lock the gears to the output shaft 262. Gears 215 may be manually engaged and disengaged by opening clutch 206 and a human driver 132 moving manual gear selector 217 to individually engage gears 215 via shift forks 213 and synchronizers 216. Thus, gears of manual transmission 208 are not automatically changed or changed via non-human actuators such as solenoids. Closing clutch 206 transfers power from engine 10 to wheels 218 when one of gears 215 is engaged via manual gear selector or shifter 217. Gear positions are reported to controller 12 via gear position sensors 275. Output shaft 262 links manual transmission 208 to wheels 218. The rotational speed of output shaft 262 may be determined via output shaft speed sensor 235. In some examples, an axle and differential 219 with gears may be positioned between manual transmission 208 and wheels 218.

Controller 12 may be configured to receive inputs from engine 10, as shown in more detail in FIG. 1, and accordingly control a torque output of the engine and/or BISG 220, and operation of the alternator 202. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. BISG output may be controlled via supplying electrical current to BISG 220 including controlling field current of BISG 220. Controller 12 may also receive input from a driver and provide status and data to a driver via a machine/human interface 299. The machine/human interface 299 may be a keyboard or touch screen device and a speaker for audible notification of a driver.

Referring now to FIG. 3, a block diagram of an alternative vehicle driveline 200 is shown. The driveline of FIG. 3 includes many of the same components described in FIG. 2. The components of FIG. 3 that have the same numerical labels as the components that are shown in FIG. 2 are equivalent to and operate the same as those that are described in FIG. 2. Therefore, for the sake of brevity, a description of the components shown in FIG. 2 is omitted.

In this example driveline 200, an integrated starter/generator (ISG) 240 electric machine is shown positioned between manually operated clutch 206 and transmission input shaft 270. ISG 240 is directly coupled to output side 260 of manually operated clutch 206. ISG 240 is also directly coupled to transmission input shaft 270. ISG 240 may receive electrical power from traction battery 242 via inverter 241. Controller 12 may command inverter 241 to supply electrical power to ISG 240 so that ISG 240 may provide positive torque to driveline 200. Alternatively, controller 12 may command inverter to operate ISG 240 in a generator mode so that traction battery 242 may be charged. ISG 240 applies a negative torque to driveline 200 when ISG 240 is operated as a generator.

In a first alternative example configuration (not shown), ISG 240 may be directly coupled to crankshaft 40 on one side and to flywheel 97 on an opposite side. Flywheel 97 may be selectively engaged by clutch plate 206a of manually operated clutch 206. Output side 260 of manually operated clutch 206 is directly coupled to input shaft 270 of manual transmission 208. Of course, the methods described herein are also applicable to other driveline configurations that are not shown.

Thus, the systems of FIGS. 1-3 provide for a vehicle system, comprising: an engine; a manual transmission coupled to the engine, the manual transmission including a clutch that moves responsive to a clutch pedal; and a controller including executable instructions stored in non-transitory memory to provide an indication to a human driver to release the clutch pedal when a speed of the engine is within a threshold speed of an input shaft of the manual transmission. The vehicle system further comprises additional instruction to increase a rotational speed rate of change of the engine via the controller during a gear shift of the manual transmission responsive to an increase in a rate of release of a clutch pedal by the human driver. The vehicle system further comprises additional instructions to command a rotational speed of a driveline torque source via the controller to a first estimate of a transmission input shaft rotational speed in response to applying the clutch of the manual transmission by a human, the first estimate of the transmission input shaft rotational speed based on a first transmission gear when the vehicle is accelerating and based on a second transmission gear when the vehicle is decelerating. The vehicle system further comprises additional instructions to accelerate the engine to a rotational speed of an input shaft of the manual transmission plus an offset speed during the gear shift of the manual transmission. The vehicle system further comprises additional instructions to accelerate the engine to a first estimated transmission input shaft rotational speed, where the estimated transmission input shaft rotational speed is based on an expected gear to be engaged. The vehicle system further comprises additional instructions to accelerate the engine to a second estimated transmission input shaft rotational speed, where the estimated transmission input shaft rotational speed is based on an engaged gear.

Referring now to FIG. 4, an example shifting sequence for a manual transmission is shown. The shifting sequence of FIG. 4 applies to the driveline configurations shown in FIGS. 2 and 3.

The first plot from the top of FIG. 4 is a plot of transmission input shaft rotational speed versus time. The vertical axis represents transmission input shaft rotational speed and transmission input shaft rotational speed increases in the direction of the vertical axis arrow. The horizontal axis represents time and time increases from the left side of the figure to the right side of the figure. Trace 402 represents the rotational speed of the transmission input shaft during the sequence.

The second plot from the top of FIG. 4 is a plot of transmission shifting state versus time. The vertical axis represents transmission shifting state and the manual transmission is being shifted when trace 404 is at a higher level near the vertical axis arrow. The manual transmission is not being shifted when trace 404 is near the horizontal axis. The horizontal axis represents time and time increases from the left side of the figure to the right side of the figure. Trace 404 represents the manual transmission shifting state during the sequence.

The third plot from the top of FIG. 4 is a plot of sign of vehicle acceleration versus time. The vertical axis represents the sign of vehicle acceleration versus time. Vehicle acceleration is positive when trace 406 is above the horizontal axis and vehicle acceleration is negative when trace 406 is below the horizontal axis. The horizontal axis represents time and time increases from the left side of the figure to the right side of the figure. Trace 406 represents the sign of vehicle acceleration.

At time t0, the transmission input shaft rotational speed is decreasing, which indicates that the vehicle is decelerating. The manual transmission is not being shifted and the vehicle acceleration is negative indicating that the vehicle is decelerating.

At time t1, a transmission shift is initiated by the human driver and the sign of vehicle acceleration changes to zero when the human driver disengages the transmission clutch to begin a downshift (e.g., shifting from a higher numerical gear to a lower numerical gear $6^{th}$-$5^{th}$). The transmission input shaft rotational speed is constant or it may decrease by a small amount.

Between time t1 and time t2, the driver changes the position of the manual shifter to disengage a higher gear and engage a lower gear. The transmission input shaft rotational speed increases after the lower gear is engaged because the gear ratio between the vehicle wheels changes while vehicle speed remains constant or changes by only a small amount. Thus, the input shaft is accelerated when the lower gear is engaged. The manually operated clutch remains disengaged.

At time t2, the driver releases the clutch pedal and the manual clutch is reengaged. The vehicle acceleration state changes to indicate negative vehicle acceleration (e.g., vehicle speed is decreasing). The downshift is complete when the manual clutch is released. The vehicle continues to decelerate.

At time t3, a transmission shift is initiated again by the human driver and the sign of vehicle acceleration changes from negative to zero when the human driver disengages the transmission clutch to begin a downshift (e.g., shifting from a higher numerical gear to a lower numerical gear $5^{th}$-$4^{th}$). The transmission input shaft rotational speed is constant or it may decrease by a small amount.

Between time t3 and time t4, the driver changes the position of the manual shifter to disengage a higher gear and engage a lower gear. The transmission input shaft rotational speed increases after the lower gear is engaged because the gear ratio between the vehicle wheels changes while vehicle speed remains constant or changes by only a small amount. The input shaft is accelerated when the lower gear is engaged. The manually operated clutch remains disengaged.

At time t4, the driver releases the clutch pedal and the manual clutch is reengaged. The vehicle acceleration state changes to indicate negative vehicle acceleration (e.g., vehicle speed is decreasing). The downshift is complete when the manual clutch is released. The vehicle continues to decelerate.

At time t5, the human driver applies the accelerator pedal to request additional torque (not shown). The vehicle changes from negative acceleration to positive acceleration and the input shaft speed begins to increase.

At time t6, transmission input shaft rotational speed reaches a higher level and the human driver initiates a transmission gear upshift (e.g., shifting the transmission from a lower numerical gear, such as $4^{th}$ gear, to a higher numerical gear, such as $5^{th}$ gear) by disengaging the transmission's manual clutch. The vehicle's acceleration state changes from positive to zero to indicate that the vehicle is not accelerating or decelerating.

Between time t6 and time t7, the driver changes the position of the manual shifter to disengage a lower gear and engage a higher gear. The transmission input shaft rotational speed decreases after the higher gear is engaged because the gear ratio between the vehicle wheels changes while vehicle speed remains constant or changes by only a small amount. Thus, the input shaft is decelerated when the higher gear is engaged. The manually operated clutch remains disengaged.

At time t7, the driver releases the clutch pedal and the manual clutch is reengaged. The vehicle acceleration state changes to indicate positive vehicle acceleration (e.g., vehicle speed is increasing) as torque is transferred from the engine to the vehicle's wheels. The upshift is complete when the manual clutch is released. The vehicle continues to accelerate between time t7 and time t8.

At time t8, transmission input shaft rotational speed reaches a higher level and the human driver initiates a transmission gear upshift (e.g., shifting the transmission from a lower numerical gear, such as $5^{th}$ gear, to a higher numerical gear, such as $6^{th}$ gear) by disengaging the transmission's manual clutch. The vehicle's acceleration state changes from positive to zero to indicate that the vehicle is not accelerating or decelerating.

Between time t8 and time t9, the driver changes the position of the manual shifter to disengage a lower gear and engage a higher gear. The transmission input shaft rotational speed decreases after the higher gear is engaged because the gear ratio between the vehicle wheels changes while vehicle speed remains constant or changes by only a small amount. Thus, the input shaft is decelerated when the higher gear is engaged. The manually operated clutch remains disengaged.

At time t9, the driver releases the clutch pedal and the manual clutch is reengaged. The vehicle acceleration state changes to indicate positive vehicle acceleration (e.g., vehicle speed is increasing) as torque is transferred from the engine to the vehicle's wheels. The upshift is complete when the manual clutch is released. The vehicle continues to accelerate after time t9.

Thus, the transmission may be upshifted and downshifted by the human driver via releasing a manually operated clutch and moving a gear shift lever. By shifting the transmission, the engine may be operated more efficiently while the vehicle accelerates or decelerates.

Referring now to FIG. 5, an example of driveline torque source rotational speed control during a downshift of a manual transmission is shown. The speed control sequence of FIG. 5 applies to the driveline configurations shown in FIGS. 2 and 3. Further, the sequence shown in FIG. 5 may be provided via the method of FIGS. 7A and 7B.

The first plot from the top of FIG. 5 is a plot of speed versus time. The vertical axis represents rotational speed of the transmission input shaft or rotational speed of a driveline torque source (e.g., engine and/or electric machine) and speed increases in the direction of the vertical axis arrow. The horizontal axis represents time and time increases from the left side of the figure to the right side of the figure. Trace 502 (solid line) represents the rotational speed of the transmission input shaft and trace 504 (dashed line) represents rotational speed of the driveline torque source. The rotational speed of the transmission input shaft and the rotational speed of the driveline torque source are equivalent when only trace 502 is visible.

The second plot from the top of FIG. 5 is a plot of transmission shifting state versus time. The vertical axis represents transmission shifting state and the manual transmission is being shifted when trace 506 is at a higher level near the vertical axis arrow. The manual transmission is not being shifted when trace 506 is near the horizontal axis. The horizontal axis represents time and time increases from the left side of the figure to the right side of the figure. Trace 506 represents the manual transmission shifting state during the sequence.

The third plot from the top of FIG. 5 is a plot of a state of driveline torque source rotational speed control mode during shifting of the mechanically operated transmission versus time. The vertical axis represents the state of the driveline torque source rotational speed control mode versus time and the driveline torque source is operating in speed control mode when trace 508 is at a higher level near the vertical axis arrow. The driveline torque source is not in speed control mode when trace 508 is near the horizontal axis. The horizontal axis represents time and time increases from the left side of the figure to the right side of the figure. Trace 508 represents the driveline torque source operating state.

At time t20, the transmission input shaft rotational speed is decreasing, which indicates that the vehicle is decelerating. A gear shift is not in progress and the driveline torque source is not operating in a speed control mode.

At time t21, a transmission shift is initiated by the human driver and the transmission shifting state changes levels to indicate that a shift is in progress. The transmission shifting state may indicate a transmission gear shift is in progress when the manually operated clutch is opened. The driveline torque source enters a speed control mode where torque of the driveline is increased or decreased so that the rotational speed of the driveline torque source matches or follows a desired driveline torque source rotational speed. The desired driveline torque source rotational speed may be a value that is stored in controller memory. In one example, the desired driveline torque source rotational speed is equal to an estimated transmission input shaft rotational speed plus an offset speed (e.g., 200 revolutions per minute (RPM)).

Between time t21 and time t22, the transmission input shaft rotational speed increases when the lower transmission gear is engaged by the human driver. The driveline torque source rotational speed is increased based on an estimated transmission input shaft rotational speed. The transmission input shaft may be estimated as is described in the method of FIGS. 7A and 7B. The driveline torque source rotational speed is increased to a level that is above the transmission input shaft rotational speed shortly before the transmission clutch is released at time t22. This may be referred to as a driveline torque source rotational speed flare. By increasing driveline torque source rotational speed above the transmission input shaft rotational speed during a transmission downshift, the driver may be supplied with an audible response that may indicate improved gear lash crossing control and driveline torque oscillation control. The speed of the torque source is adjusted to the transmission input shaft speed plus and offset speed. After the torque source speed reaches the transmission input shaft speed plus the offset speed, the torque source speed is adjusted to the transmission input shaft speed so that the torque source speed is reduced after the speed flare. Speed of the driveline torque source may be increased if the driveline torque source is an internal combustion engine by opening a throttle and increasing fuel flow to the engine. Speed of the driveline torque source may be increased if the driveline torque source is an electric machine by increasing an amount of current that is supplied to the electric machine.

At time t22, the human driver releases the clutch pedal, which causes the driveline torque source rotational speed and transmission input shaft rotational speed to be equal. The shift state transitions to a lower level to indicate that the manual transmission gear shift is complete.

In this way, speed of the driveline torque source may be increased to a level that is greater than transmission input shaft rotational speed when a manual transmission is downshifted. Then, the rotational speed of the driveline torque source is reduced to a rotational speed of the transmission input shaft so that the possibility of driveline torque disturbances may be reduced.

Figure 7A:
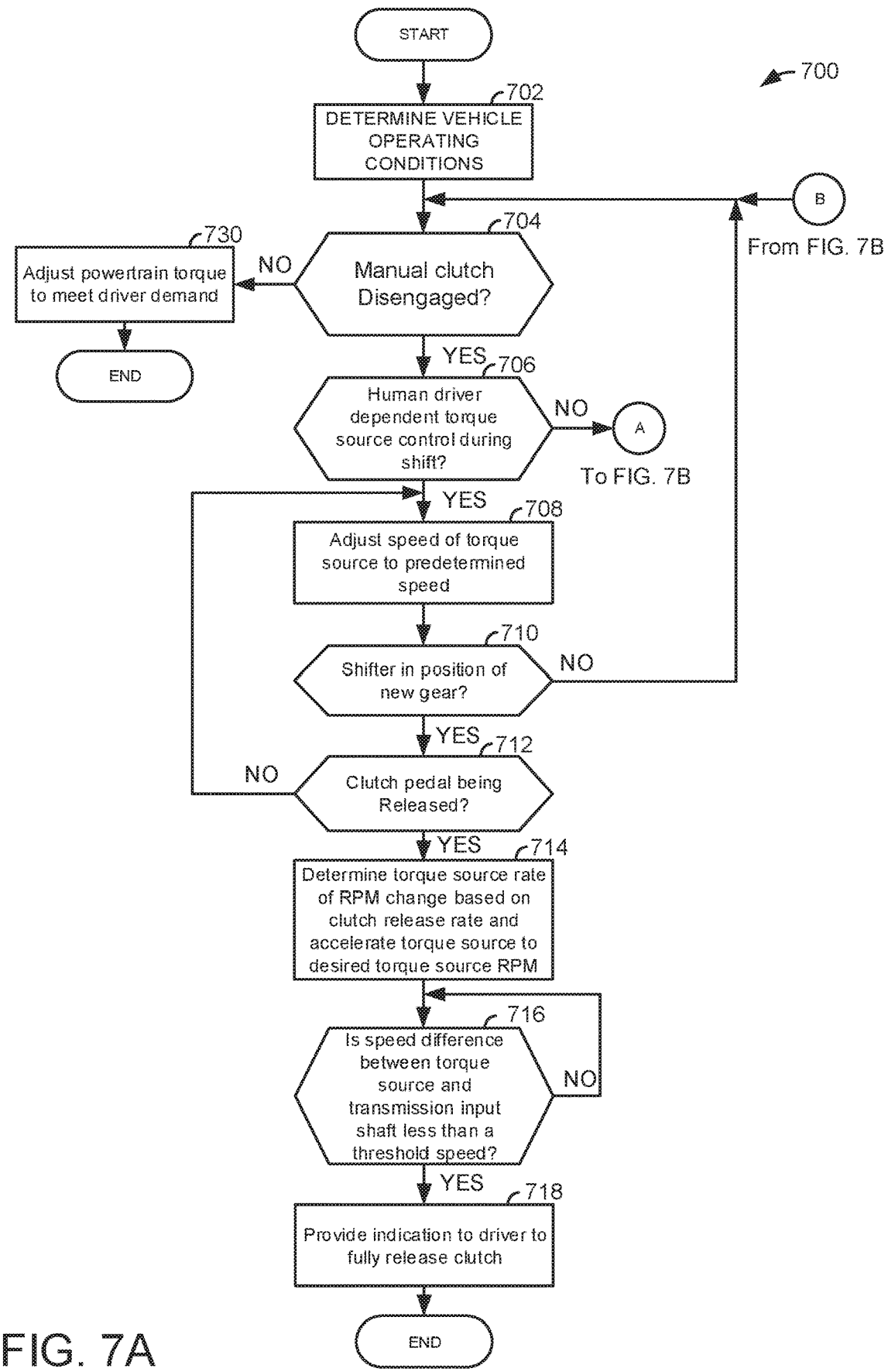
FIGS. 7A and 7B show an example method for assisting a human driver during shifting of a manual transmission.
Figure 7B:
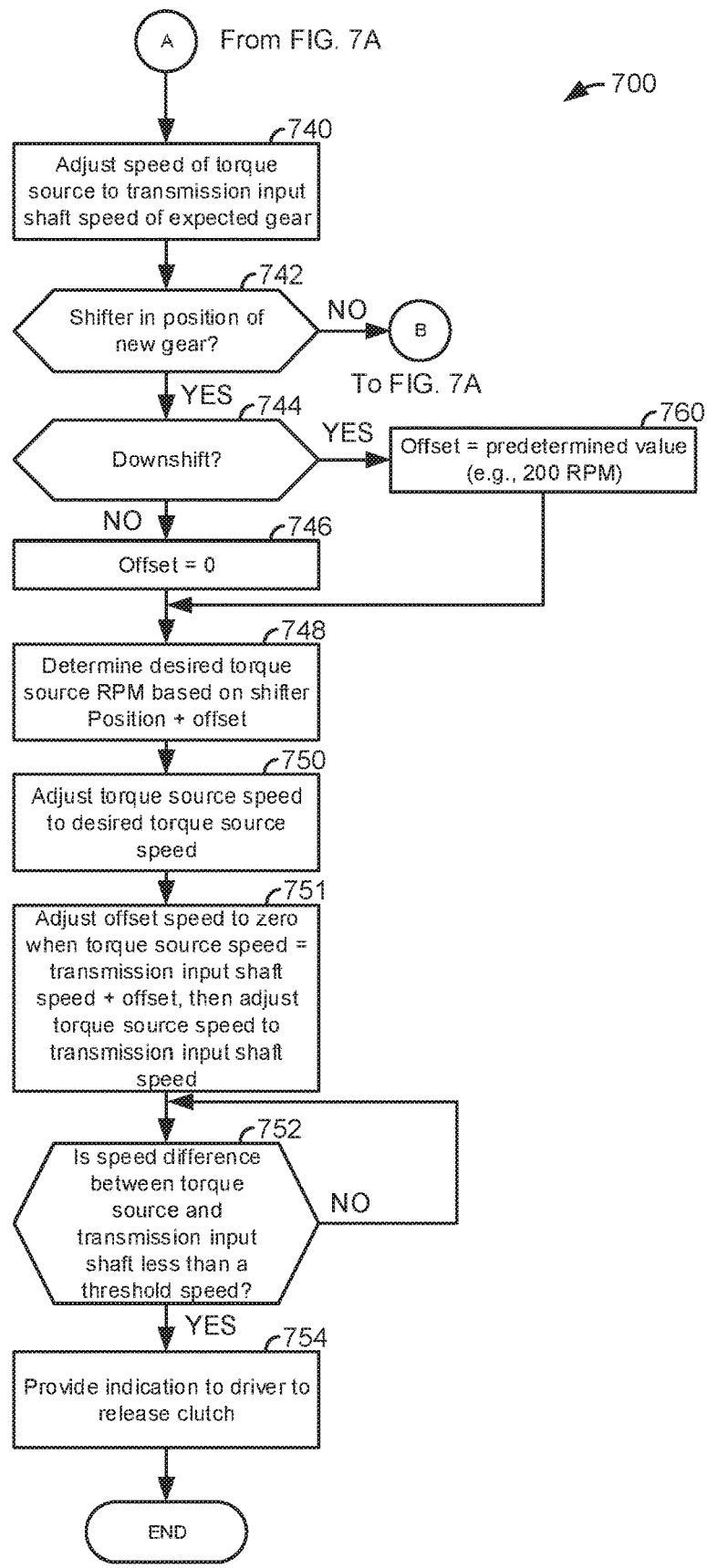

Referring now to FIG. 6, an example manual transmission gear shifting sequence according to the method of FIGS. 7A and 7B is shown. The manual transmission gear shifting sequence of FIG. 6 applies to the driveline configurations shown in FIGS. 2 and 3. Vertical markers at t40-t46 represent times of interest during the sequence.

The first plot from the top of FIG. 6 is a plot of transmission input clutch engagement percentage versus time. The vertical axis represents transmission input clutch engagement percentage and transmission input clutch engagement percentage increases in the direction of the vertical axis arrow. The horizontal axis represents time and time increases from the left side of the figure to the right side of the figure. Trace 602 represents the transmission input clutch engagement percentage. The transmission input clutch (e.g., 206 of FIG. 2) is fully disengaged and it may transmit no torque when the engagement percentage is 0%. Horizontal line 650 represents a level of the clutch reengagement threshold 651 where the clutch's capacity to transfer torque meets the torque output of the driveline torque source, which may be a predetermined estimated value.

The second plot from the top of FIG. 6 is a plot of speed versus time. The vertical axis represents speed and speed increases in the direction of the vertical axis arrow. Speed is zero at the level of the horizontal axis. The horizontal axis represents time and time increases from the left side of the figure to the right side of the figure. Trace 604 represents the manual transmission input shaft rotational speed. Trace 606 represents speed of the driveline torque source (e.g., engine and/or electric machine).

The third plot from the top of FIG. 6 is a plot of commanded torque source rotational speed rate of change versus time. The vertical axis represents the torque source rotational speed rate of change command versus time and the torque source rotational speed rate of change command increases in the direction of the vertical axis arrow. The horizontal axis represents time and time increases from the left side of the figure to the right side of the figure. Trace 608 represents the torque source rotational speed rate of change (e.g., 200 RPM/second).

At time t40, the transmission manually operated clutch is fully closed and 100% engaged. The transmission input shaft rotational speed is decreasing, which indicates that the vehicle is decelerating. The torque source speed rate of change is zero. These conditions indicate that the vehicle is decelerating while the transmission is engaged in a gear.

At time t41, the vehicle's human driver (not shown) begins to release the manual transmission clutch by pressing the clutch pedal. The transmission input shaft rotational speed continues to decline and the driveline torque source speed rate of change is zero.

Between time t41 and time t42, the transmission clutch engagement percentage continues to decrease as the human driver presses the clutch pedal further. In addition the transmission input shaft rotational speed continues to decrease. The transmission input shaft rotational speed continues to decline and the driveline torque source rotational speed rate of change is not commanded to follow a desired speed (e.g., transmission input shaft speed). Rather, the driveline torque source may be in a torque control mode.

At time t42, the transmission clutch engagement percentage reaches a value of zero and the transmission's manual clutch is fully released. The driveline torque source is commanded to a constant predetermined speed (e.g., idle speed of the internal combustion engine plus a threshold RPM). The transmission input shaft rotational speed continues to decline as the vehicle decelerates in the presently engaged gear. The driveline torque source rotational speed rate of change is zero.

At time t43, the human driver has disengaged a previously engaged higher gear (e.g., $3^{rd}$ gear) and engaged a new lower gear (e.g., $2^{nd}$ gear). Engaging the lower gear begins to accelerate the transmission input shaft. The transmission clutch remains disengaged and the driveline torque source rotational speed rate of change is zero. The driveline torque source's speed remains constant.

Between time t43 and time t44, the transmission input shaft rotational speed is accelerated to a value that is a function of the transmission output speed, which is a function of the vehicle speed. The transmission input shaft speed reaches the value that is the function of the transmission output shaft speed as soon as the new gear is engaged. The transmission input shaft rotational speed decelerates as the vehicle decelerates after the transmission input shaft rotational speed is equal to transmission output shaft speed multiplied by the ratio of the engaged gear. The torque source speed continues at its previous constant speed. The driveline torque source rotational speed rate of change is zero.

At time t44, the human driver begins to release the transmission's manually operated clutch (not shown) and the transmission clutch engagement begins to increase as the manually operated clutch pedal is released. The controller determines a clutch engagement rate as is described in further detail in the description of FIGS. 7A and 7B. The torque source speed rate of change is adjusted (e.g., increased) responsive to the clutch engagement rate and the torque source speed rate of change operates to ensure that rotational speed of the torque source is equivalent to rotational speed of the transmission input shaft when the transmission clutch engagement percentage reaches the level of a level of the clutch reengagement threshold 651. In this way, the speed of the driveline torque source may match the transmission input shaft rotational speed when the transmission clutch has capacity that is sufficient to transfer torque output by the driveline torque source. In other words, the transmission clutch may transfer torque output by the driveline torque source to the vehicle's wheels when the speed of the torque source is substantially equal to (e.g., torque source RPM is within 100 RPM of transmission inputs shaft RPM) speed of the transmission input shaft. This may help to reduce the possibility of driveline torque disturbances.

Between time t44 and time t45, the transmission input clutch engagement percentage continues to increase and the torque source speed increases. The transmission input shaft rotational speed decreases as vehicle speed decreases. The torque source speed rate of change continues at its previous level.

At time t45, the transmission input clutch engagement matches the level of the clutch reengagement threshold 650. The torque source speed is also equal to the transmission input shaft rotational speed. The torque source speed rate if change is no longer controlled for the purpose of synchronizing the torque source rotational speed and the transmission input shaft rotational speed. Additionally, the vehicle's human driver may be prompted to fully release the clutch via a human/machine interface at time t45.

At time t46 the transmission input clutch engagement percentage is 100% so that the transmission clutch is fully engaged. The transmission input shaft rotational speed and the torque source speed are equivalent and the torque source speed rate of change is no longer controlled for the purpose of synchronizing the torque source rotational speed and the transmission input shaft rotational speed.

In this way, a human driver of a manual transmission may be assisted to shift a manual transmission. By adjusting the speed of the driveline torque source, excessive clutch slippage may be avoided. Further, large torque disturbances to the driveline may be reduced.

Referring now to FIGS. 7A and 7B, a method for operating a vehicle is shown. The method of FIGS. 7A and 7B may be at least partially implemented as executable instructions stored in non-transitory controller memory. The method of FIGS. 7A and 7B may cooperate with and be a part of the system of FIGS. 1-3. At least portions of the method of FIGS. 7A and 7B may be actions taken in the physical world via controller 12 to transform operating conditions of a vehicle. Further, the method of FIGS. 7A and 7B along with the system of FIGS. 1-3 may provide the sequence shown in FIG. 6.

At 702, method 700 determines vehicle operating conditions. Vehicle operating conditions may be determined via data input to a controller from vehicle sensors and actuators. Vehicle operating conditions may include but are not limited to engine speed, vehicle speed, presently selected gear, accelerator pedal position, clutch pedal position, driver demand torque, and brake pedal position. Method 700 proceeds to 704 after vehicle operating conditions are determined.

At 704, method 700 judges if the manual transmission's clutch is disengaged. In one example, method 700 may judge that manual transmission clutch is disengaged based on output of a clutch pedal position sensor. If method 700 judges that the manually operated clutch is disengaged, the answer is yes and method 700 proceeds to 706. Otherwise, the answer is no and method 700 proceeds to 730.

At 730, method 700 adjusts powertrain torque to meet the driver demand torque. The driver demand torque is determined from the accelerator pedal position. The accelerator pedal position and vehicle speed are used to reference or index a table or function. The table or function outputs the driver demand torque. Torque of the powertrain torque source or sources (e.g., engine, motor, or motor and engine) are adjusted to provide the driver demand torque. The engine torque may be adjusted via adjusting a position of a torque actuator such as a throttle, camshaft, and/or spark timing. The motor torque may be adjusted via adjusting a voltage and/or current that is supplied to the motor via an inverter. Method 700 proceeds to exit after the powertrain torque is adjusted.

At 706, method 700 judges if human driver dependent torque source control is to be applied during a shift. If so, the answer is yes and method 700 proceeds to 708. Otherwise, the answer is no and method 700 proceeds to 740 of FIG. 7B. Human driver dependent torque source control during a shift adjusts a torque source speed rate of increase in response to a rate of release of a clutch pedal by a human driver. Such operation seeks to match a rotational speed of the torque source to a rotational speed of the transmission input shaft for the selected gear by the time the clutch pedal reaches a position where the manually operated clutch has capacity to transfer the torque output by the driveline torque source. Thus, whether the driver releases the clutch pedal at a fast rate or a slow rate, the manually operated clutch may smoothly transfer torque from the powertrain torque source to the transmission input shaft without excessive clutch slippage or an abrupt torque change in the vehicle driveline.

At 708, method 700 commands or adjusts speed of the driveline torque source or torque sources to a predetermined speed. The predetermined speed may be based on the gear being disengaged and the gear being engaged. For example, if the vehicle is accelerating and the transmission is being shifted from $3^{rd}$ gear to $4^{th}$ gear, the predetermined speed may be 1000 RPM. However, if the vehicle is decelerating and the transmission is being shifted from $3^{rd}$ gear to second gear, the predetermined speed may be 1200 RPM. The predetermined speed values may be empirically determined while the vehicle is being driven. The predetermined speed values may be stored on controller non-transitory memory and they may be retrieved during transmission shifting. Method 700 adjusts the speed of the driveline torque sources to the predetermined speed and proceeds to 710.

At 710, method 700 judges if the transmission's gear shifter has changed to a position of a new gear. For example, if the transmission's gear selected was in the position for $2^{nd}$ gear before the clutch pedal was applied and the gear selector is presently in the position for $3^{rd}$ gear, then it may be determined that the transmission's gear shifter has changed to a position of a new gear. If method 700 judges that the transmission's gear shifter has changed to a position of a new gear, the answer is yes and method 700 proceeds to 712. Otherwise, the answer is no and method 700 returns to 704.

At 712, method 700 judges if the clutch pedal is being released. Method 700 may judge that the clutch pedal is being released from output of the clutch pedal position sensor. Method 700 proceeds to 714 if it is determined that the clutch pedal is being released. Method 700 returns to 708 if it is determined that the clutch pedal is not being released.

At 714, method 700 determines the torque source speed rate of change (e.g., torque source acceleration rate) based on the clutch pedal release rate and accelerates the driveline torque source or sources to the desired torque source rotational speed. In one example, method 700 determines the torque source speed rate of change based on the following equations:

$$\text{Clutch\_engage\_rate} = \frac{P_1 - P_0}{t_1 - t_0}$$

$$t_{ce} = \frac{\text{Clutch\_engage\_thld}}{\text{Clutch\_engage\_rate}} + t_0$$

$$\text{Tis\_rpm\_rate} = \frac{\text{Tis\_rpm}(t_1) - \text{Tis\_rpm}(t_0)}{t_1 - t_0}$$

$$\text{Tis\_rpm}(t_{ce}) = \text{Tis\_rpm}(t_0) + (\text{Tis\_rpm\_rate} \cdot t_{ce})$$

$$\text{Ts\_rpm\_rate} = \frac{\text{Tis\_rpm}(t_{ce}) - \text{Ts\_rpm}(t_0)}{t_{ce} - t_0}$$

where Clutch_engage_rate is the engagement rate of the clutch, $P_1$ is clutch pedal position at time $t_1$, where time $t_1$ is a time after the clutch pedal begins to release and before the time the clutch is engaged, to is the time where the clutch pedal begins to be released, $t_{ce}$ is the time when the clutch is engaged, Clutch_engage_thld is a percentage of the clutch pedal where the clutch is engaged (e.g., 651 in FIG. 6), Tis_rpm_rate is transmission input shaft speed rate of change, Ts_rpm_rate is the torque source speed rate of change, and Tis_rpm (t) is transmission input shaft rotational speed at time t.

Method 700 commands the driveline torque source (e.g., engine and/or motor) to the desired torque source speed Tis_rpm($t_{ce}$), which is the estimated transmission input shaft rotational speed at time $t_{ce}$. The torque source is commanded to Tis_rpm ($t_{ce}$) at the torque source rotational speed rate of change Ts_rpm_rate. Method 700 proceeds to 716.

At 716, method 700 judges if a speed difference between the rotational speed of the torque source and a rotational speed of the transmission input shaft is less than a threshold speed. If so, the answer is yes and method 700 proceeds to 718. Otherwise, the answer is no and method 700 returns to 716.

At 718, method 700 provides an indication to the human driver to fully release the clutch pedal. The indication may be a visual indication that is presented via a human/machine interface, or alternatively, an audible indication may be provided to the human driver. By indicating that the clutch pedal may be fully released, the driver is prompted to fully close the clutch, which may reduce clutch slip and degradation. Method 700 proceeds to exit.

At 740, method 700 adjusts speed of the driveline torque source or torque sources to an expected speed of the transmission input shaft that is based on an expected gear to be engaged by the driver. If the vehicle is accelerating, then the expected gear is the number of the present gear plus one. Thus, if the vehicle is accelerating in $1^{st}$ gear, then the expected gear is $2^{nd}$ gear. If the vehicle is decelerating, then the expected gear is the number of the present gear minus one. The transmission input shaft rotational speed based on the expected gear may then be estimated by multiplying the transmission output shaft speed by the ratio of the expected gear. The driveline torque source is then commanded to the speed of the transmission input shaft that is based on the expected gear. Method 700 proceeds to 742.

At 742, method 700 judges if the transmission's gear shifter has changed to a position of a new gear. For example, if the transmission's gear selected was in the position for 2nd gear before the clutch pedal was applied and the gear selector is presently in the position for $3^{rd}$ gear, then it may be determined that the transmission's gear shifter has changed to a position of a new gear. If method 700 judges that the transmission's gear shifter has changed to a position of a new gear, the answer is yes and method 700 proceeds to 744. Otherwise, the answer is no and method 700 returns to 704.

At 744, method 700 judges if the transmission is being downshifted. In one example, method 700 may be judged to be downshifting if the manually operated clutch is disengaged or being disengaged and the vehicle is decelerating. Method 700 may be judged to be upshifting if the manually operated clutch is disengaged or being disengaged and the vehicle is accelerating. If method 700 judges that the transmission is being downshifted, the answer is yes and method 700 proceeds to 760. Otherwise, the answer is no and method 700 proceeds to 746.

At 746, method 700 adjusts a driveline torque source rotational speed offset value to zero. By adjusting the driveline torque source rotational speed offset value to zero, a torque source speed flare above the transmission input shaft rotational speed may be avoided. This may be beneficial during upshifts where the transmission input shaft rotational speed is reduced during the upshift when a gear of a higher numerical value is engaged. Method 700 proceeds to 748 after the driveline torque source rotational speed offset value is adjusted to zero.

At 760, method 700 adjusts a driveline torque source rotational speed offset value to a predetermined value (e.g., 200 RPM). By adjusting the driveline torque source rotational speed offset value to a predetermined value, a torque source speed flare above the transmission input shaft rotational speed may be implemented so that gear lash crossing may be avoided and so that a human driver may audibly notice the change in driveline torque source rotational speed. The predetermined value may be based on the gear that is being engaged. Method 700 proceeds to 748 after the driveline torque source rotational speed offset value is adjusted to the predetermined value.

At 748, method 700 determines a desired torque source speed based on the position of the gear shifter and the offset value. The transmission input shaft rotational speed based on the engaged gear may be estimated by multiplying the transmission output shaft speed by the ratio of the engaged gear. Method 700 proceeds to 750.

At 750, method 700 commands the torque source to the transmission input shaft rotational speed that is based on the engage gear plus the offset speed. Method 700 proceeds to 751.

At 751, method 700 adjusts the offset speed to zero when the rotational speed of the torque source is equal to the rotational speed of the transmission input shaft plus the offset speed.

The rotational speed of the torque source is then adjusted to the rotational speed of the transmission input shaft so that torque disturbances may be reduced when the clutch is closed. Method 700 proceeds to 752.

At 752, method 700 judges if a speed difference between the rotational speed of the torque source and a rotational speed of the transmission input shaft is less than a threshold speed. If so, the answer is yes and method 700 proceeds to 754. Otherwise, the answer is no and method 700 returns to 752.

At 754, method 700 provides an indication to the human driver to fully release the clutch pedal. The indication may be a visual indication that is presented via a human/machine interface, or alternatively, an audible indication may be provided to the human driver. By indicating that the clutch pedal may be fully released, the driver is prompted to fully close the clutch, which may reduce clutch slip and degradation. Method 700 proceeds to exit.

In these ways, method 700 may assist a human driver of a manual transmission vehicle to shift transmission gears. In one example, speed of a torque source is adjusted at a rate that is dependent of a release rate of a clutch pedal so that torque source speed matches transmission input shaft rotational speed when a manual clutch engages so that driveline torque disturbances may be reduced. In another example, the speed of the torque source may be commanded first to a transmission input shaft rotational speed that is based on an expected transmission gear to be engaged. Once the shifter engages a gear, then the torque source is commanded to a transmission input shaft rotational speed that is based on the engaged gear. Thus, if the expected gear is different from the engaged gear, speed of the torque source may be adjusted to reduce the possibility of driveline torque disturbances.

Thus, the method of FIGS. 7A and 7B provides for a method for operating a vehicle, comprising: receiving sensor input to a controller and increasing a rotational speed rate of change of a torque source of a driveline responsive to a rate of release of a clutch pedal by a human driver via a controller during a gear shift of a manual transmission. The method includes where the shift of the manual transmission is a downshift to a lower gear. The method includes where the torque source is an electric machine. The method further comprises increasing a rotational speed of the torque source to an estimated transmission input shaft rotational speed plus an offset speed. The method includes where the offset speed is dependent on an engaged transmission gear. The method further comprises adjusting a speed command of the torque source of the driveline to a predetermined speed in response to a manually operated clutch being disengaged before increasing the rotational speed rate of change of the torque source of the driveline. The method further comprises increasing the rotational speed rate of change of the torque source of the driveline responsive to an estimated transmission input shaft rotational speed. The method further comprises providing a visual indication to fully release an applied clutch of the manual transmission in response to a rotational speed of the torque source is within a threshold speed of a rotational speed of an input shaft of the manual transmission.

The method of FIGS. 7A and 7B also provides for a method for operating a vehicle, comprising: commanding a rotational speed of a driveline torque source via a controller to a first estimate of a transmission input shaft rotational speed in response to applying a clutch of a manual transmission by a human, the first estimate of the transmission input shaft rotational speed based on a first transmission gear when the vehicle is accelerating and based on a second transmission gear when the vehicle is decelerating; and commanding the rotational speed of the driveline torque source via the controller to a second estimate of transmission input shaft rotational speed in response to engagement of a gear other than the first transmission gear or the second transmission gear during the application of the clutch. The method further comprises providing a visual or audible notification to the human to release the clutch. The method includes where the visual or audible notification is based on the rotational speed of the driveline torque source being within a threshold rotational speed of the transmission input shaft rotational speed. The method includes where the first estimate of transmission input shaft rotational speed includes an offset speed. The method includes where the driveline torque source is an electric machine. The method includes where the gear other than the first transmission gear or the second transmission gear is a gear that is numerically lower than second transmission gear or numerically higher than the first transmission gear.

As will be appreciated by one of ordinary skill in the art, method described herein may represent one or more of any number of processing strategies such as event-driven, interrupt-driven, multi-tasking, multi-threading, and the like. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle, comprising:
commanding a rotational speed of a driveline torque source via a controller to a first estimate of a transmission input shaft rotational speed in response to applying a clutch of a manual transmission by a human, the first estimate of the transmission input shaft rotational speed based on a first transmission gear when the vehicle is accelerating and the first estimate of the transmission input shaft rotational speed based on a second transmission gear when the vehicle is decelerating; and
commanding the rotational speed of the driveline torque source via the controller to a second estimate of transmission input shaft rotational speed in response to engagement of a gear other than the first transmission gear or the second transmission gear during the application of the clutch.

2. The method of claim 1, further comprising providing a visual or audible notification to the human to release the clutch.

3. The method of claim 2, where the visual or audible notification is based on the rotational speed of the driveline torque source being within a threshold rotational speed of the transmission input shaft rotational speed.

4. The method of claim 1, where the first estimate of transmission input shaft rotational speed includes an offset speed.

5. The method of claim 1, where the driveline torque source is an electric machine.

6. The method of claim 1, where the gear other than the first transmission gear or the second transmission gear is a gear that is numerically lower than second transmission gear or numerically higher than the first transmission gear.

* * * * *